March 7, 1950     J. A. MURRAY     2,500,134
HOUSEHOLD DEMINERALIZATION
Filed June 13, 1946
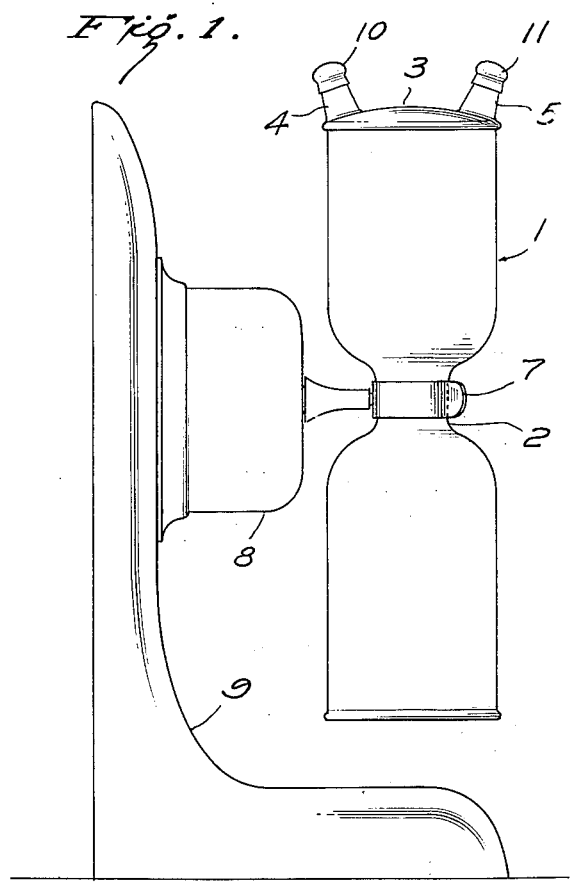
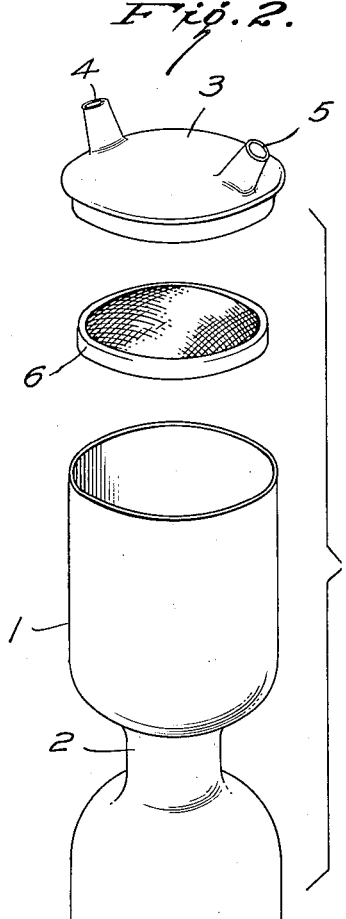
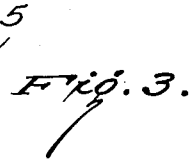
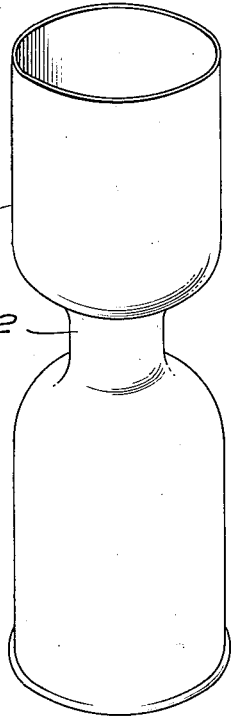
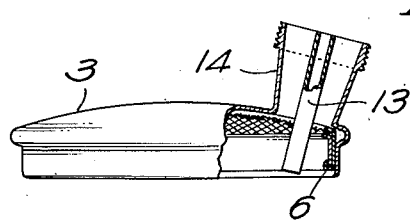
INVENTOR
JOHN A. MURRAY,
BY Elizabeth Ann Krider
AGENT Patented Mar. 7, 1950

2,500,134

UNITED STATES PATENT OFFICE 2,500,134

HOUSEHOLD DEMINERALIZATION

John A. Murray, New Hyde Park, N. Y., assignor to American Cyanamid Company, New York, N. Y., a corporation of Maine Application June 13, 1946, Serial No. 676,478

5 Claims. (Cl. 210—24)

This invention relates to an apparatus for demineralizing liquid and more particularly, to an apparatus adapted for household demineralization of relatively small quantities of water.

In the past, various devices have been suggested for use as household water softeners. For the most part these devices have been attachments placed on water spigots through which ordinary tap water flows. The attachment contains ion exchange material of one type or another, and the water in passing through is subjected to at least a superficial softening.

There have also been commercialized larger household water softeners and/or demineralizers which comprise systems having capacities of a great many gallons of water per day. This is a large scale operation and necessarily expensive, far too expensive for the ordinary household.

The housewife often needs or desires a small quantity of demineralized liquid, particularly water, quickly. Since the methods of the prior art mentioned briefly in the preceding paragraphs do not adequately meet this requirement, I have designed a liquid demineralizer which may be used for quick and convenient demineralization of liquids by contact with cation and anion exchange materials.

The apparatus of the present invention comprises a container having two chambers with a constricted connection between them as, for example, an hour-glass shaped container which is especially suitable, a removable cover therefor, discharging means located either in the cover or in the side of one of the chambers of the container and adapted for discharging a liquid from the container, means for closing the discharging means, and filtering means in conjunction with the discharging means adapted to separate solid particles from liquid.

When the liquid to be demineralized and the demineralizing agent which is a mixture of cation and anion exchange materials are placed in the container, the container is revolved about its diametrical axis to bring about thorough mixing of the liquid and demineralizing material. The container may be so revolved by hand or, if desired, it may be mounted in any suitable manner and revolved by means of a motor.

My invention will be described in greater detail in conjunction with the drawing in which Fig. 1 is a diagrammatic side view of a mounted, motor driven demineralizing apparatus according to the present invention;

Fig. 2 is an exploded projected view of the demineralizing apparatus of Fig. 1;

Fig. 3 is a vertical section of an assembly of cover, discharge means and filtering means; and Fig. 4 is a side elevation, partially broken away and shown in section, of a particular discharge means for the container.

Referring to Fig. 1, a substantially cylindrical container 1 having a constricted portion 2 about half-way along its length its fitted with a cover 3 which is provided with pouring means including spouts 4 and 5 through either of which the demineralized liquid may be poured. Covers 10 and 11 are provided for the spouts. The cover is also fitted with filtering means 6 which is shown in Figs. 2, 3 and 4.

The container 1 is mounted in a spring friction clamp 7 which is attached to the spindle of a motor 8. The motor 8 is mounted on a stand 9, which may be of wood, plastic, metal or any other suitable material.

Fig. 2 needs no detailed description since identical parts are identified by the same reference numerals as used in Fig. 1. Fig. 2 illustrates how the filtering means 6 fits into the cover 3 and the assembly, in turn. onto the container 1.

Fig. 3 illustrates the cover 3 with filtering means 6 comprising a metallic screen 12 in place.

Fig. 4 illustrates a variation of the cover for the container in which the second spout is eliminated and replaced by a tube 13 placed concentrically within the spout 14 and held in place by means of the filter means 6. As a matter of fact, if the spout of the discharge means is constructed properly with respect to diameter, etc. and positioned properly on the apparatus, a single spout without any special air-admitting means may provide efficient means of discharge and simplify the device.

A convenient modification of the cover, not illustrated, consists in the provision therein of means for measuring the proper quantities of cation and anion exchange materials necessary for demineralization of a single liquid charge. A cover equipped with such measuring means may be inverted and the exchange materials placed in the indicated compartments. When the cover is turned over in order to place it on the container, the exchange materials drop from their respective compartments into the liquid which it is desired to demineralize.

The apparatus of the present invention may be made of any suitable rigid material such as metal, plastic, laminated carboard of high wet strength, etc. A similar choice of materials is available for all parts of the apparatus. For example, the filtering means may be made of a metal screening, cloth, perforated plastic, etc., just so long as it is liquid permeable but, at the same time, impermeable to the particles of ion exchange material.

Obviously, any type motor may be used in a power-driven embodiment of the present invention. I prefer the use of a clockwork or small electric motor because of its convenience and ready applicability to household operation of the device of the present invention. The clockwork may be constructed so that it may be wound by revolving the container after it is placed in the clip and then permitted to unwind. It may be so constructed and adjusted that the winding and unwinding will be sufficient to obtain adequate demineralization of the water. In this way the operator will know that it is only necessary for successful demineralization to completely wind the clockwork and then to permit it to unwind.

The present invention is in no sense limited to the use of any particular ion exchange materials although I prefer to use the synthetic resinous anion and cation exchangers. Examples of anion resins which may be employed are: the aldehyde condensation products of m-phenylene diamine, biguanide, guanyl urea, substituted guanidines such as methyl guanidine, substituted biguanides such as phenyl biguanide, polyamines, preferably the polyethylene polyamines, etc. Such condensation products are preferably formaldehyde products although other aldehyde condensation products may be used if desired. Examples of other aldehydes are acetaldehyde, crotonaldehyde, furfural, acrolein, benzaldehyde, etc. The active resins, such as those prepared from guanidine, guanyl urea, biguanide and other materials which do not form sufficiently insoluble condensation products with formaldehyde for most practical purposes, are preferably insolubilized with suitable formaldehyde-reactive materials, e. g., urea, thiourea, the aminotriazines (especially melamine and the guamines which react with formaldehyde to produce insoluble products), etc. The anion active resins prepared from guanidine, guanyl urea, biguanide, etc. may be prepared in the same general manner as described in U. S. Patents Nos. 2,251,234 and 2,285,750. Usually it is convenient to use the salts of the bases, but the free bases may also be used. Examples of suitable salts for use in the preparation of anion active resins are guanidine carbonate, guanidine sulfate, biguanide sulfate, biguanide nitrate, guanyl urea sulfate, guanyl urea nitrate, guanyl urea carbonate, etc.

Other anion active resins which are suitable for use in the process of my invention include condensation products of polyalkylene polyamines with acetaldehyde and formaldehyde, with crotonaldehyde and formaldehyde, with epichlorohydrin and/or glycerol dichlorhydrin and/or polyepoxy compounds, with polyacrylic acid, with bifunctional triazines, with acrylonitrile adducts of ammonocarbonic acids, etc. Also aldehyde condensation products of furyl substituted aliphatic amines, particularly furfuryl amines, may be used.

The anion active resin employed must, of course, be activated and this may be done in the conventional manner by treatment with a dilute alkaline substance such as, e. g., a 0.1%–10% solution of sodium hydroxide, sodium carbonate, a corresponding potassium salt, etc.

Cation active materials which are suitable for use in my process include furfural or formaldehyde condensation products of the condensation product of acetone, furfural, and sodium bisulfite, condensation products of furfural with mineral acid halides, polyhydric phenol-aldehyde condensation products such as the catechol tannin-formaldehyde condensation products, aromatic sulfonic acid condensation products as described in U. S. Patent No. 2,204,539, carbonaceous substances, i. e., the sulfated or sulfonated carbonaceous materials such as coal, peat, lignite, etc.

The cation active resins may be hydrogen activated or, if softening is desired rather than complete demineralization, they may be used on a sodium cycle. If the cation active materials are to operate on the hydrogen cycle, the resin may be activated by treating the resins with acid solutions, e. g., 0.1%–10% of hydrochloric acid, sulfuric acid, etc. If the cation active materials are to be operated on the sodium cycle, they should be activated by treating with a salt solution such as an aqueous solution of sodium chloride.

I claim:

1. An apparatus, useful for demineralizing a liquid wherein the liquid is contacted with solid demineralizing material, which comprises an elongated container capable of holding liquids and having a single constricted portion about halfway along its length, an opening in one end of said container said opening being equipped with a removable liquid-tight cover, liquid discharge means located in, and forming an integral part of, said cover and adapted for discharging liquid from said container, and filtering means positioned between said liquid discharge means and said container and adapted for separating said liquid from solid particles of demineralizing material as said liquid is discharged from said container.

2. An apparatus as in claim 1 in which the filtering means comprises a screen.

3. An apparatus as in claim 1 in which the filtering means comprises a screen and a filter cloth.

4. An apparatus as in claim 1 in which the liquid discharge means includes two spouts.

5. An apparatus as in claim 1 in which the liquid discharge means includes one spout containing a hollow tube held concentrically therein.

JOHN A. MURRAY.

REFERENCES CITED

The following references are of record in the file of this patent:

UNITED STATES PATENTS

| Number | Name | Date |
| --- | --- | --- |
| 58,770 | Butterfield | Oct. 16, 1866 |
| 1,120,229 | Nieman | Dec. 8, 1914 |
| 1,504,329 | Edelstein | Aug. 12, 1924 |
| 1,664,435 | Smith | Apr. 3, 1928 |
| 1,698,743 | Sweeney | Jan. 15, 1929 |
| 1,751,671 | Webb | Mar. 25, 1930 |
| 1,774,257 | English | Aug. 26, 1930 |
| 1,951,917 | Leslie | Mar. 20, 1934 |
| 1,967,469 | Du'any | July 24, 1934 |
| 2,155,318 | Liebknecht | Apr. 18, 1939 |
| 2,370,190 | Ralston | Feb. 27, 1945 |
| 2,404,367 | Durant et al. | July 23, 1946 |

FOREIGN PATENTS

| Number | Country | Date |
| --- | --- | --- |
| 25,261 | Great Britain | of 1912 |
| 136,771 | Great Britain | Dec. 24, 1919 |
| 295,004 | Great Britain | Dec. 20, 1928 |

OTHER REFERENCES

Ser. No. 359,575, Pieter Smit (A. P. C.), published May 11, 1943.